Hunter & Blewitt,
Facing for Buildings.
No. 96,921.   Patented Nov. 16, 1869.
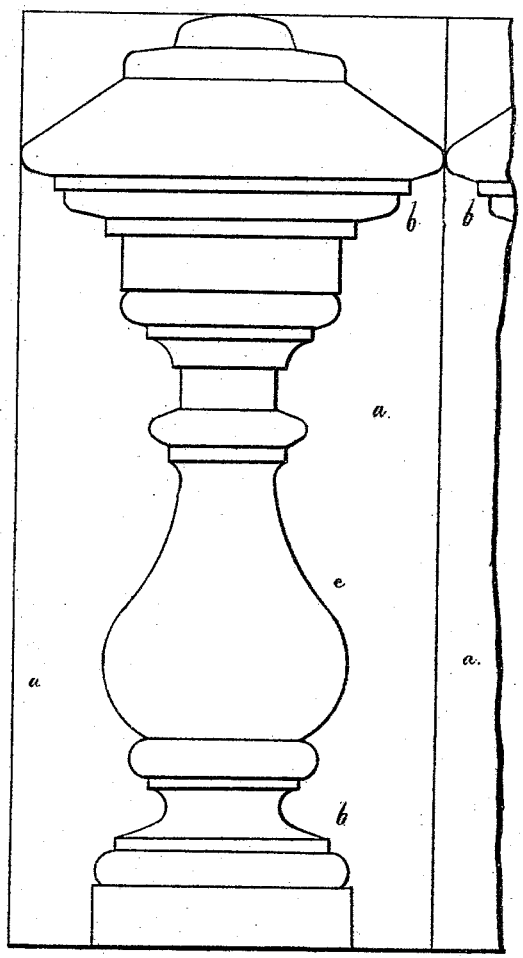
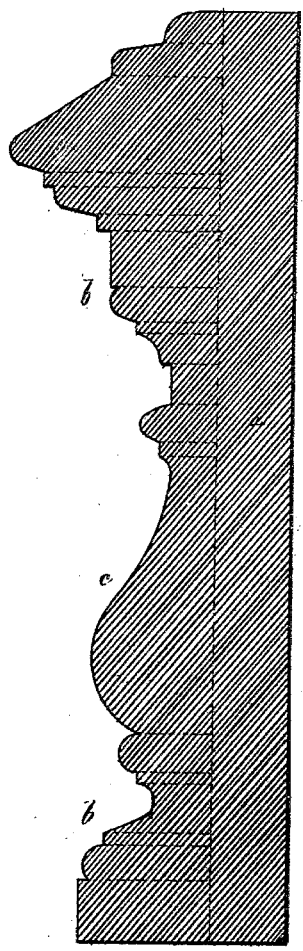
Witnesses,
Chas H Smith
Geo. D Walker
H Hunter
John Blewitt

UNITED STATES PATENT OFFICE.

THOMAS A. HUNTER AND JOHN BLEWITT, OF NEW YORK, N. Y.

IMPROVED FACING FOR BUILDINGS.

Specification forming part of Letters Patent No. 96,921, dated November 16, 1869.

*To all whom it may concern:*

Be it known that we, THOMAS A. HUNTER and JOHN BLEWITT, of the city and State of New York, have invented and made a new and useful Improvement in Buildings; and we do hereby declare the following to be a full, clear, and exact description of the said invention, reference being had to the annexed drawings, making part of this specification, wherein—

Figure 1 is an elevation illustrating the improvement in question, and Fig. 2 is a section of the same.

Like parts are denoted by similar letters.

Heretofore it has been usual to make the facings of buildings of stone carved to the desired shape. There is considerable labor involved in the preparation of the stone, and many kinds of stone absorb moisture and the surface becomes disintegrated from the action of frost or the moisture and atmospheric influences, or else the same becomes discolored. Cast-iron has been employed in place of stone; but this requires to be painted frequently, or else it rusts and becomes disfigured or permanently injured.

Our invention consists in the employment of cast glass as a surface for buildings, the same being prepared in such manner as to be available for this purpose. This glass is as strong as many qualities of building-stones, and produces a very handsome surface to the edifice. It is not injured in any manner by the action of water or the atmosphere. It retains its color, and can be cast into moldings, slabs, balusters, or other ornamental devices for the surfaces of buildings. It is preferable to grind the backs of the slabs and the meeting edges, in order that the mortar or cement employed may adhere more strongly, and the meeting joints are rendered straight and true, so as to fit more closely. The body of the building may be of brick, stone, or other material built up with the glass in a manner similar to stone.

In the drawings we have represented the slab $a$ as ornamented with moldings at $b\ b$ and with a balustrade at $c$. The form of the slab and ornaments, however, will vary according to the place in which they are to be used.

In cases where the article is unnecessarily strong if made solid, the same may be formed hollow, and molding, blowing, or rolling may be resorted to, according to the character of article to be produced. Tombs, monuments, and slabs produced in this way are very durable, and any lettering, cast, carved, or cut thereon cannot be obliterated.

If desired, the surface of the glass might be ornamented with figures or designs countersunk or in relief; or colors may be employed either for the entire surface of the glass or for ornamental designs; and these colors should be burned in, as is well known in staining glass.

What we claim, and desire to secure by Letters Patent, is—

A facing for buildings, made of glass and prepared in the manner specified, as a new and useful article of manufacture.

In witness whereof we have hereunto set our signatures this 17th day of April, A. D. 1869.

T. A. HUNTER.
     JOHN BLEWITT.

Witnesses:
 CHAS. H. SMITH,
 GEO. T. PINCKNEY.